(No Model.)

I. S. BATES.
FENDER ATTACHMENT TO CULTIVATORS.

No. 248,129. Patented Oct. 11, 1881.

WITNESSES:
W. W. Hollingsworth
W. Read

INVENTOR:
I. S. Bates
BY
ATTORNEYS.

UNITED STATES PATENT OFFICE.

ISAAC S. BATES, OF MINONK, ILLINOIS.

FENDER ATTACHMENT TO CULTIVATORS.

SPECIFICATION forming part of Letters Patent No. 248,129, dated October 11, 1881.

Application filed July 14, 1881. (No model.)

*To all whom it may concern:*

Be it known that I, ISAAC S. BATES, of Minonk, in the county of Woodford and State of Illinois, have invented a new and useful Improvement in Fender Attachments to Wheel-Cultivators; and I do hereby declare that the following is a full, clear, and exact description of the same, reference being had to the accompanying drawings, forming part of this specification, in which—

Figure 1:
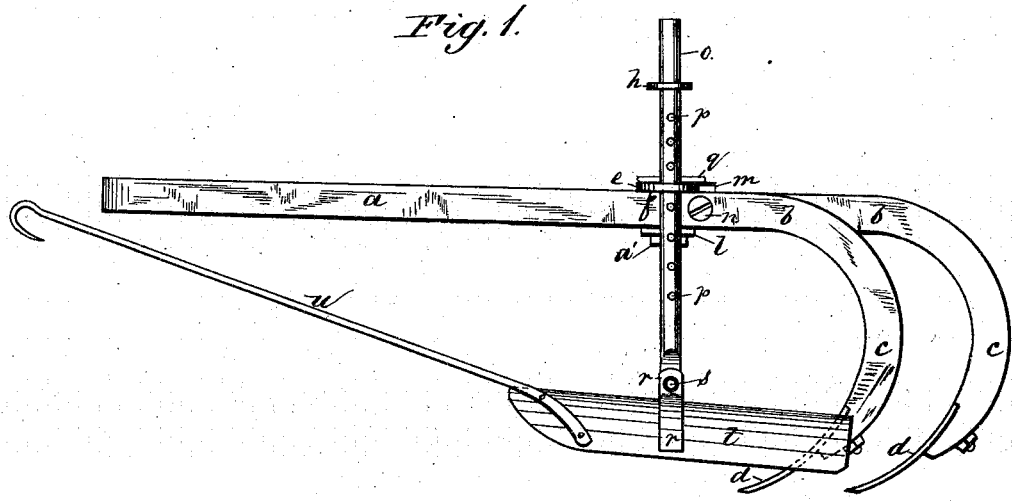
Figure 2:
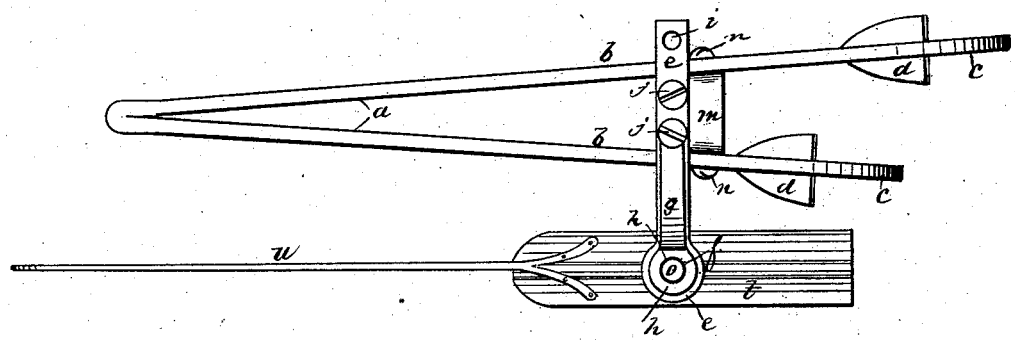

Figure 1 is a side elevation of my improved fender attachment to wheel-cultivators. Fig. 2 is a plan view of same.

My invention relates to fender attachments to wheel-cultivators; and it consists in the peculiar construction and arrangement of the parts, as hereinafter more fully set forth.

In the accompanying drawings, *a* represents the beam of a wheel-cultivator, composed of two horizontal parts, *b b*, secured together at their forward ends, and thence diverging rearwardly and curved downwardly at their rear ends to form the standards *c c*, to the lower ends of which the shovels *d d* are bolted, in the usual manner.

*e* represents an adjustable plate, provided with an eye, *f*, in one end and an upwardly-projecting arm, *g*, having an eye, *h*, at its outer end.

The adjustable plate *e* rests on the upper face of the beam, and is provided with a series of adjusting-holes, *i*, for the passage of screws *j*, provided with nuts *a'*, and adapted to engage in adjusting-holes *k* in a plate, *l*, lying under the beam *a*.

*m* represents a plate bent perpendicularly at its ends, and provided with screw-threaded holes in its bent ends for the passage of screws *n*, which pass through the bifurcated parts of the beam and through the bent ends of the plate *m*, which projects slightly above the upper face of the beam.

*o* represents a rod provided with adjusting-holes *p*, for the passage of a pin, *q*. The rod *o* passes through the eyes *f* and *h* of the adjustable plate *e* and arm *g*, secured to the plate, and can be adjusted vertically, as desired, by the pin *q* and holes *p*.

To the lower end of the rod *o* is pivotally secured by the straps *r r* and pin *s* the fender or screen *t*, made of a bent piece of metal closed at top and open at its bottom and ends, and adapted in the forward movement of the cultivator to move over a row of corn or other plants and protect them from the dirt turned toward them by the shovel.

*u* represents a rod secured at one end to the back of the fender *t*, at the forward end thereof, and provided at its opposite end with a hook adapted to engage with an eye secured to the axle of the wheel-cultivator, or an eye in a suitable part of the frame of the cultivator. By this construction it will be seen that the plates *e l*, constituting, with their connecting-screws *j*, a clamp, are capable of lateral adjustment in both directions, and that the fender is therefore capable of lateral adjustment in both directions, and is also vertically adjustable to suit the height of the corn or other plants in the row, and is also pivotally secured to the rod *o*.

In my construction a series of beams provided with downwardly-curved standards having shovels secured thereto are attached to an axle, as in wheel-cultivators of the usual construction, a fender being employed between each two adjacent cultivators.

I claim as my invention—

The combination, with the beam *a*, laterally-adjustable clamping-plate *e*, provided with adjusting-holes *i*, eye *f*, and arm *g*, having eye *h*, and adjustable clamping-plate *l*, of the vertical perforated rod *o*, pivotally secured to the fender and passing through the eyes *f h*, fender *t*, and rod *u*, secured at one end to the fender and provided with a hook at its opposite end, substantially as described, and for the purpose set forth.

ISAAC S. BATES.

Witnesses:
MARTIN L. NEWELL,
HIRAM GRABLE.